United States Patent [19]
Wagner

[11] 4,169,630
[45] Oct. 2, 1979

[54] SHEET METAL NUT

[75] Inventor: David P. Wagner, Geneva, Ill.

[73] Assignee: Illinois Tool Works Inc., Chicago, Ill.

[21] Appl. No.: 882,695

[22] Filed: Mar. 2, 1978

[51] Int. Cl.² .......................... B60B 3/16; F16B 37/14
[52] U.S. Cl. ................ 301/9 DN; 85/32 R;
    85/35; 151/38; 301/63 PW
[58] Field of Search .............. 85/32 R, 32 T, 35;
    151/19 R, 21 R, 38; 301/9 DN, 63 PW

[56] References Cited

U.S. PATENT DOCUMENTS

| | | | |
|---|---|---|---|
| 840,791 | 1/1907 | Mohring | 151/38 |
| 1,229,911 | 6/1917 | Dodds | 151/38 |
| 1,300,832 | 4/1919 | Gallagher | 85/1.5 R |
| 2,101,514 | 12/1937 | Schmaus | 85/32 R X |
| 2,161,740 | 6/1939 | Eksergian | 151/38 UX |
| 2,287,691 | 6/1942 | Marchou | 85/32 R X |
| 2,394,491 | 2/1946 | Schaper | 151/21 R X |
| 2,723,584 | 11/1955 | Parker | 85/32 R |
| 3,198,229 | 8/1965 | Beltoise | 85/32 R X |
| 3,364,806 | 1/1968 | Chaivre | 85/35 |
| 3,560,052 | 2/1971 | Verdier | 85/32 R |

FOREIGN PATENT DOCUMENTS

| | | | |
|---|---|---|---|
| 730089 | 1/1943 | Fed. Rep. of Germany | 85/32 R |
| 1939910 | 2/1971 | Fed. Rep. of Germany | 301/63 PW |
| 2203108 | 9/1972 | Fed. Rep. of Germany | 301/63 PW |
| 700170 | 12/1930 | France | 85/32 R |
| 46-24326 | 7/1971 | Japan | 85/32 T |
| 832019 | 4/1960 | United Kingdom | 85/32 R |

*Primary Examiner*—Thomas J. Holko
*Attorney, Agent, or Firm*—Richard K. Thomson; Robert W. Beart

[57] ABSTRACT

A one-piece sheet metal nut particularly adapted to be clamped against a plastic workpiece to accommodate any cold flow of the plastic under the clamping force without appreciably reducing the tension in the joint thus created. The nut incorporates an inner internally threaded body integrally connected by an upper top wall to an outer body. The lower region of the outer body is frustoconical and adapted to engage a mating frustoconical surface in the plastic with the uppermost extremities of the nut incorporating an axially compressible spring means permitting portions of the sheet metal nut to move longitudinally relative to one another, which, in conjunction with the broad surface contact between frustoconical surfaces, overcomes any cold flow effect.

9 Claims, 6 Drawing Figures

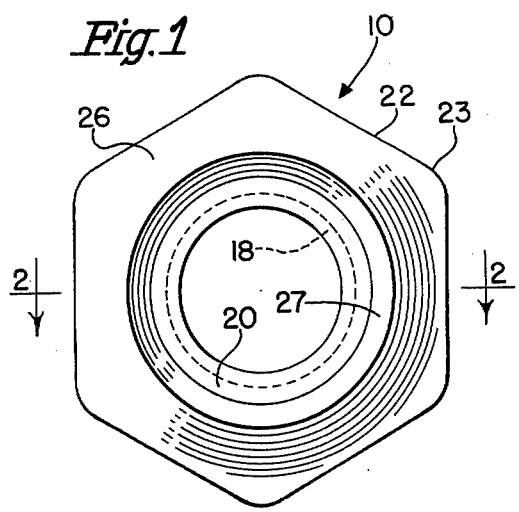
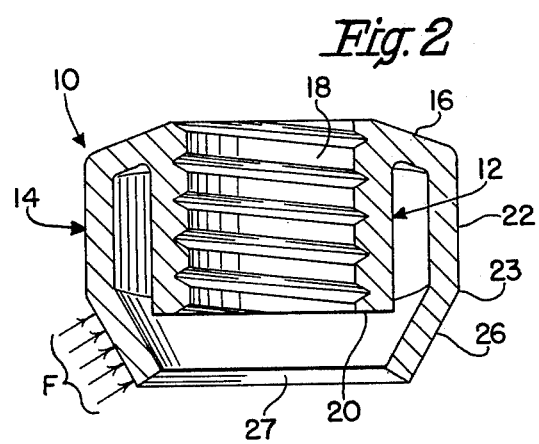
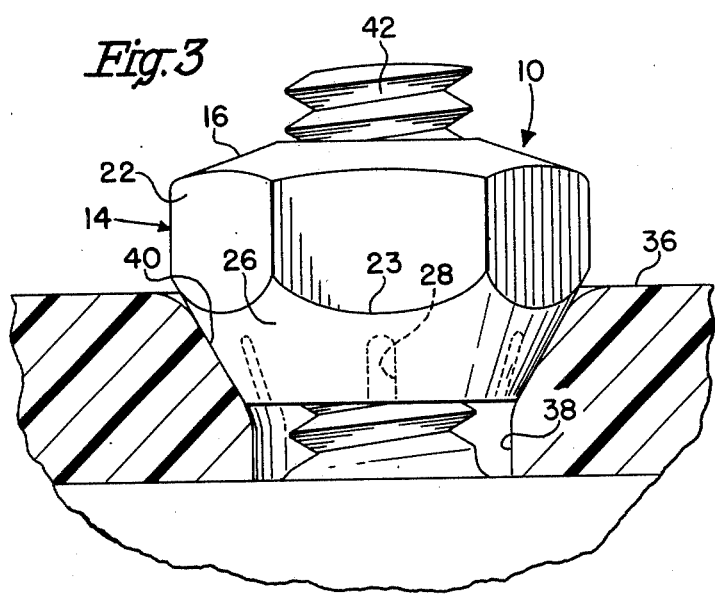
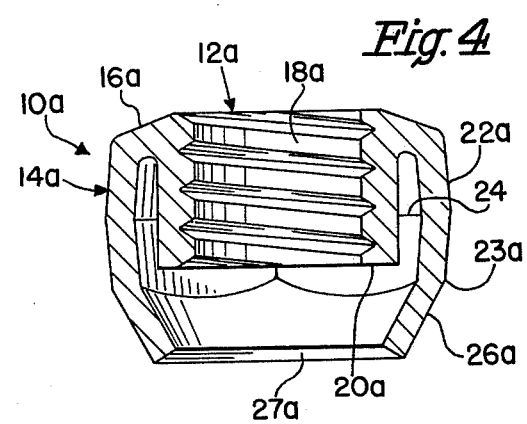
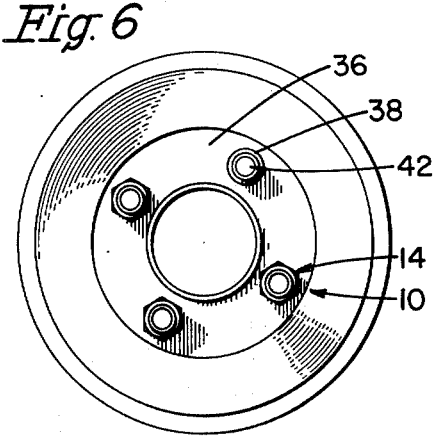
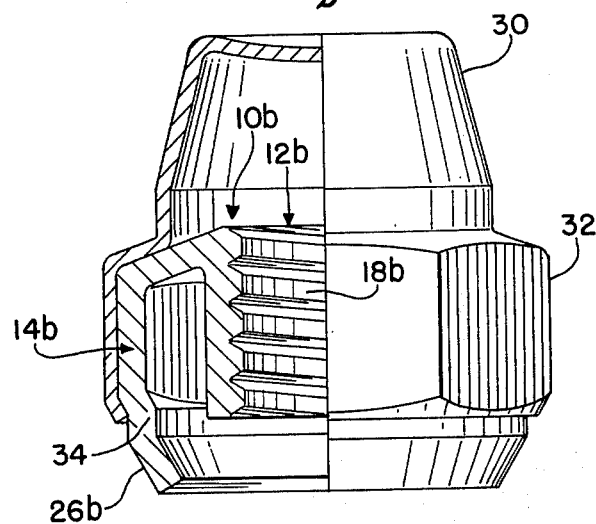

SHEET METAL NUT

BACKGROUND AND SUMMARY OF THE INVENTION

This invention relates to a sheet metal nut and more particularly to a nut device which incorporates a compressible spring feature.

A growing trend in material selection, particularly in the automotive industry, is the supplanting of steel with a plastic-type material. Weight reduction, without an accompanying structural deficiency, is thus possible through the use of certain thermoplastic and/or composite thermoplastic materials. One of the inherent disadvantages of the use of a plastic material as a structural member or in a fastening joint is the tendency of plastic to cold flow or creep in response to a static force applied over a certain time period to a discrete region of the plastic surface.

Obviously, if a plastic material is used as a structural member under a very sensitive clamping load, as for example, in an application where the wheel rims of automobiles are formed of plastic, the cold flow problem becomes critical and must be overcome.

Accordingly, it is an object of this invention to provide a sheet metal nut which can reliably be utilized to clampingly engage a plastic workpiece.

A further more specific object of the invention is to provide a sheet metal nut which may be utilized as in the clamping securement of a plastic wheel in the hub of an automobile.

A particular advantage of the invention is the ability of a thin sheet metal device to distribute a clamping load over a wide surface area of plastic and in addition incorporate a spring feature which resiliently accommodates any force applied to the plastic material.

The above and other objects and advantages of the invention are obtained by a one-piece sheet metal nut basically including a tubular inner body region with internally formed threads and a substantially tubular outer body region connected at the uppermost extremities by a top wall. The lowermost region of the outer body is a frustoconical surface and the aperture created by the lower edge of the frustoconical surface is preferably greater than the inner diameter of the threaded bore. Spring means are formed in the upper portion of the nut and, in a preferred embodiment, the spring means is incorporated in the top wall. The inner body may axially move downwardly relative to the outer body to provide a resilient clamping load while permitting the frusto conical surface to remain in broad surface contact with the thermoplastic. Both the broad surface contact and the spring serve to overcome any inherent cold flow problems in the clamp joint.

BRIEF DESCRIPTION OF THE DRAWINGS

FIG. 1 is a bottom plan view of the nut device.

FIG. 2 is a cross-sectional view as taken along the lines 2—2 of FIG. 1.

FIG. 3 is a side elevational view, in partial section, of the nut member associated with a stud in clamping engagement with a plastic workpiece.

FIG. 4 is a sectional view similar to FIG. 2 showing an alternate embodiment of the invention.

FIG. 5 is a side elevational view, in partial section, of a further embodiment of the invention incorporating a, secondary, outer covering for the nut and exposed stud extremity.

FIG. 6 is a side elevational view of a thermoplastic wheel mounted in accordance with the present invention with one of the nut devices removed.

DESCRIPTION OF THE PREFERRED EMBODIMENTS OF THE INVENTION

Referring now to the drawings wherein like numerals have been employed to designate similar parts throughout the various figures, it will be seen that a sheet metal nut member representative of an embodiment of the invention is designated generally by the numeral 10. Nut member 10 can be generally described as incorporating a tubular inner body portion 12 radially spaced and connected to a generally tubular outer body 14. The two body portions are integrally connected at their uppermost regions by a top wall 16. The bore of the inner body region 12 is preferably embossed or otherwise deformed into a plurality of thread convolutions 18.

With reference to FIGS. 1–3, it will be seen that the outer wall 14 comprises an upper section 22 and a lower section 26. The upper section is preferably configured to include a plurality of torque accepting surfaces, such as the hex configuration shown. The upper section of the body and the inner body are preferably concentric and generally parallel to the axis of the nut. With such a hex configuration, a conventional nut runner or socket wrench device can be utilized to apply the nut 10 to a workpiece.

It is important to note, however, that the lowermost region 26 of the outer body 14 is a frustoconical section tapering inwardly and downwardly from its junction 23 with the upper portion 22. The lowermost extremity edge of the frustoconical region 26 is a generally circular aperture 27 which is preferably of a diameter greater than the inner diameter of the threaded bore 18 so that the lower region of the outer wall will not engage the associated threaded stud. The total axial extent of the outer body will be greater than the axial extent of the inner body. The body members may be dimensioned or configured so that the lower edge 20 of the inner body positively abuts the inner periphery of surface 26 after an axial deflection of a predetermined amount sufficient to resiliently absorb the forces in the system and yet prevent overloading the joint.

The angular relationship of the frustoconical surface 26 to the upper body surfaces 22 will preferably be about 30°, for a purpose to be described later herein.

A particular application which requires the advantages of the invention is the securement of a wheel rim on an automobile hub. Typically, such wheels are clamped on the hub by the positioning of a plurality of radially spaced studs on the hub through aligned bores in the plastic wheel. For example, as shown in FIG. 3, one such joint includes a thermoplastic wheel body 36 having a through bore 38, with a frustoconical counterbore 40. The frustoconical counterbore 40 is typically an angle of 30° to the axis which is consistent with the preferred angular relationship of the frustoconical surface 26 on the nut and this mating arrangement facilitates the clamping location of one part relative to the other. It is important to note that as the nut is rotated into clamping engagement with the plastic wheel 36, the frustoconical surface 26 distributes the clamping load over a relatively wide surface area. This, in and of itself in part, alleviates the cold flow problem inherent in plastic. It is important, therefore, that this broad surface contact remains during continued exertion of clamping force rather than permitting the force to be concentrated along an edge or at a point.

For this purpose, attention is directed to the embodiment of top wall 16 in FIG. 2. Top wall 16 may be frustoconically configured to provide an axially compressible leaf spring in the joint permitting the outer body 14 to telescopically move relative to the inner body 12 under clamping pressure, leaving the mating frustoconical regions 26 and 40 in continued broad clamping engagement with one another.

However, it should be noted, with reference to FIG. 2, that the reactive forces applied on the nut, in such an application and as shown by the force vectors F, actually are a combination of axial and radial forces. Thus, a spring hinge formed by the topwall 16 interconnecting the inner and outer bodies 12 and 14 not only permits the axial force to be resiliently absorbed but also permits the radial force to be resiliently absorbed in a manner which pivots the force applying surface 26 about a region remote from the surface. This spring arrangement in the nut member contributes to the continued application of force over a broad surface area.

The material of the nut 10 is preferably of a heat treatable material so it can be so treated to provide the springs desired in the system.

It should be understood that suitable spring configurations for nut members of this invention can take a variety of forms. If, for various reasons, the outside transverse dimension of the nut member 10 is to be minimized, the space between the outer body portion 14 and inner body portion 12 could be reduced without an accompanying reduction in the spring functions of the invention. For example, in FIG. 4, an alternate embodiment 10a shows an inner tubular portion 12a with a threaded bore 18a, similar to the preferred embodiment, but the outer body portion 14a is more closely spaced to the inner body 12a than in embodiment of FIGS. 1-3. This arrangement essentially creates a strut or columnar member in the upper region 22a since narrow upper wall 16a may not be free to flex in the manner of the embodiment of FIGS. 1-3. However, upon exertion of a clamping pressure, the column 22a may bow slightly outwardly providing the combined axial and radial resilience desired in the invention. To enhance the capability of outer body 14a to bow, a slight pre-bowed or angular condition can be designed into the outer body 14a. For example, a bend line 24 can be positioned intermediate the extremities of the outer body 14a to overcome the strut effect of the outer wall. Thus, the nut member 10a is sufficiently designed to accept and distribute load over a large surface area in a frustoconical recess in a plastic member and yet accept and absorb forces both in the radial and axial directions to maintain the surface contact. Both features, of course, contribute to the resistance to cold flow.

Still another advantage of the invention is its ability to incorporate a decorative or protective overcap. For example, in FIG. 5, a further embodiment of the nut incorporating the features of the invention 10b is shown again to include an inner body region 12b and an outer body region 14b terminating in a lower, frustoconical load bearing surface 26b. However, a decorative or corrosive resistant cap may be snappingly associated with the torque accepting surfaces on the upper body 14b. The cap can include an integral dome-shaped axial extension 30 covering the free extremity of a threaded stud and mating side walls 32 conforming to the polygonal surfaces 14b. The dome-shaped cap may be snappingly retained in an annular depression 34 adjacent the load bearing frustoconical surface 26b.

In addition to the spring features and load bearing features described herein relative to the invention, a still further modification can be made to provide an additional advantageous feature to the invention. For example, with reference to FIG. 3 dotted line outlines 28 show where generally radially extending cutouts can be formed in the frustoconical load bearing surface 26. Such cutouts will provide a certain amount of independent flexing to radial segments of the load bearing surface and in addition could provide a positive mechanical lock should a small amount of plastic material cold flow up into or adjacent the edges formed by the slots 28.

Thus, it is apparent that there has been provided in accordance with the invention a one-piece sheet metal nut that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A one-piece sheet metal nut member for clampingly securing a thermoplastic workpiece to a primary workpiece, wherein the properties of the thermoplastic workpiece are such that it exhibits cold flow under load, said nut comprising a tubular, radially inner body portion extending downwardly a first predetermined axial distance from an upper wall surface, the inner periphery of said inner body portion having a first predetermined inner diameter and including a plurality of thread convolutions in a central through bore; a generally tubular, radially outer body portion surrounding said inner body portion and extending downwardly a second predetermined axial distance from the upper wall surface, the second axial distance being greater than the first axial distance so that the lowermost extremity of the outer body is spaced downwardly from the lowermost extremity of the inner body; the upper wall surface integrally connecting the uppermost extremities of the inner and outer body portions; the outer body portion comprising an upper and a lower section, the lower section being a downwardly and inwardly tapered frustoconical load bearing surface terminating at a circular aperture having a center substantially on the longitudinal axis of the tubular, threaded inner body portion; the diameter of said aperture being a second predetermined diameter greater than said first diameter of the threaded inner body portion, the upper section being generally concentric with the inner body portion and including torque accepting surfaces on its outer periphery, the upper section of the outer body and the upper wall surface incorporating axially compressible spring means for permitting the inner body to move axially relative to the outer body without disturbing the broad surface contact between the frustoconical lower outer body section and a bearing surface of the thermoplastic workpiece; wherein the frustoconical load bearing surface of said nut is adapted to matingly engage a frustoconical recess surrounding a through bore in the thermoplastic workpiece so that the nut, with an associated threaded stud extending through the bore in the thermoplastic workpiece, can compressingly clamp said thermoplastic workpiece and distribute the clamping force over the workpiece in a manner which minimizes the cold flow effect in the clamped joint and remain in clamping engagement inspite of said cold flow.

2. The nut member of claim 1, wherein the upper wall radially spaces the outer body from the inner body and forms a laterally extending hinge means permitting the outer body portion to resiliently, telescopically move relative to the inner body.

3. The nut member of claim 2, wherein the upper wall is generally frustoconical, tapering downwardly and outwardly toward its juncture with the uppermost extremity of the outer body portion.

4. The nut member of claim 1, wherein the upper section of the outer body is generally polygonal creating said torque accepting surfaces.

5. The nut member of claim 1, including a dome-shaped overcap snappingly retained by said nut member superimposing the upper wall, outer body and threaded through bore.

6. The nut member of claim 1, wherein the upper section of the outer body forms a load bearing strut with the uppermost and lowermost extremities of said strut axially aligned, the region of said strut intermediate these extremities adapted to bow outwardly, creating an axially compressible leaf spring under a predetermined load.

7. The nut member of claim 1, wherein the surface region of the lower outer body forms a positive stop for the lowermost edge of the inner body portion to control the compression of the spring member in the nut.

8. The sheet metal nut member of claim 1, which is heat treated to provide the necessary spring characteristic in a joint.

9. The sheet metal nut member of claim 1, in combination with a thermoplastic wheel rim which exhibits a tendency to cold flow under load and includes a plurality of radially spaced through bores and frustoconical counterbores formed in at least one extremity of the bores, a plurality of threaded stud devices extending through said bores into threaded engagement with said nut members, the frustoconical load bearing surface clampingly engaging the frustoconical counterbore to distribute the load over a relatively large surface area with the spring means adapted to take up any loss in tension in the joint as a result of cold flow of the thermoplastic material.

* * * * *